US011861493B2

(12) United States Patent
Vengertsev et al.

(10) Patent No.: US 11,861,493 B2
(45) Date of Patent: Jan. 2, 2024

(54) MACHINE LEARNING MODELS BASED ON ALTERED DATA AND SYSTEMS AND METHODS FOR TRAINING AND USING THE SAME

(71) Applicant: MICRON TECHNOLOGY, INC., Boise, ID (US)

(72) Inventors: Dmitry Vengertsev, Boise, ID (US); Zahra Hosseinimakarem, Boise, ID (US); Jonathan D. Harms, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 601 days.

(21) Appl. No.: 16/854,107

(22) Filed: Apr. 21, 2020

(65) Prior Publication Data

US 2021/0201195 A1    Jul. 1, 2021

Related U.S. Application Data

(60) Provisional application No. 62/955,297, filed on Dec. 30, 2019.

(51) Int. Cl.
*G06N 3/08* (2023.01)
*G06N 3/04* (2023.01)
(Continued)

(52) U.S. Cl.
CPC .............. *G06N 3/08* (2013.01); *G06F 18/214* (2023.01); *G06F 18/24* (2023.01); *G06N 3/04* (2013.01); *G06V 10/764* (2022.01); *G06V 10/82* (2022.01)

(58) Field of Classification Search
None
See application file for complete search history.

(56) References Cited

U.S. PATENT DOCUMENTS 9,691,027 B1   6/2017 Sawant et al.
10,878,124 B1 * 12/2020 Sitaraman .............. G06N 7/005
(Continued)

FOREIGN PATENT DOCUMENTS

KR    20160081811 A    7/2016

OTHER PUBLICATIONS

Automatic Anonymization of Textual Documents: Detecting Sensitive Information via Word Embeddings, by Hassan et al 2019 18th IEEE International conference on trust, security and Privacy in computing and communications, pp. 358-365 (Year: 2019).*

(Continued)

*Primary Examiner* — Vikkram Bali
(74) *Attorney, Agent, or Firm* — Dorsey & Whitney LLP

(57) ABSTRACT

Data may be abstracted and/or masked prior to being provided to a machine learning model for training. A machine learning model may provide a confidence level associated with a result. If the confidence level is too high, the machine learning model or an application including the machine learning model may refrain from providing the result as an output. In some examples, the machine learning model may provide a "second best" result that has an acceptable confidence level. In other examples, an error signal may be provided as the output. In accordance with examples of the present disclosure, data may be abstracted and/or masked prior to being provided to a machine learning model for training and confidence levels of results of the trained machine learning model may be used to determine when a result should be withheld.

25 Claims, 11 Drawing Sheets

(51) Int. Cl.
*G06F 18/24*     (2023.01)
*G06F 18/214*    (2023.01)
*G06V 10/764*    (2022.01)
*G06V 10/82*     (2022.01)

(56) References Cited

U.S. PATENT DOCUMENTS

2010/0138370 A1   6/2010   Wu et al.
2017/0149793 A1   5/2017   Spertus et al.
2017/0372226 A1   12/2017  Costa et al.

OTHER PUBLICATIONS

International Search Report and Written Opinion dated Mar. 15, 2021 for PCT Application No. PCT/US2020/063622.
PCT Patent Application No. PCT/US20/63622 titled "Machine Learning Models Based on Altered Data and Systems and Methods for Training and Using the Same" filed Dec. 7, 2020.

* cited by examiner

MACHINE LEARNING MODELS BASED ON ALTERED DATA AND SYSTEMS AND METHODS FOR TRAINING AND USING THE SAME

CROSS REFERENCE TO RELATED APPLICATION(S)

This application claims priority to U.S. Provisional Application No. 62/955,297 filed Dec. 30, 2019. The aforementioned application is incorporated herein by reference, in its entirety for any purpose.

BACKGROUND

Machine learning generally encompasses a variety of methods for utilizing one or more computational models to classify or otherwise infer meaning from data. Examples of models include, but are not limited to, an artificial neural network (deep and shallow, convolutional, recurrent, probabilistic graphical models, Bayesian neural networks, etc.), a decision tree based methods, and a support vector machine, including Kernelized versions. In some cases, a model may include one or more algorithms and diverse network architectures. Typically, training the model includes providing a training data set. The computing device analyzes the training data set to develop the model. The trained model may then be used (by the same computing device or another computing device) to analyze new data sets to complete one or more tasks, such as providing an output responsive to an inquiry. The training may be supervised or unsupervised or semi-supervised. In some cases, the model may continue to be trained and/or modified over time based on additional data received after the initial training, referred to as a dynamically trained model.

In some applications, the training data and/or additional data may include sensitive information (e.g., personally identifying information, financial information, proprietary business information). Releasing the sensitive information may cause harm to individuals or entities (e.g., identity theft). Accordingly, preventing exposure of sensitive information in training data and/or additional data provided to the model may be desirable.

DETAILED DESCRIPTION

Sensitive data may be included in training data provided to train a model of a machine learning application and/or in other data provided to a dynamically trained model. While the models are trained to classify or otherwise infer meaning from data based on the training set and/or other data, in some cases, due to the method of training and/or the contents of the training set, the model may "memorize" data from the training set. In these cases, the model may output the memorized data responsive to a determined classification or inference based on data input to the model. In some instances, the memorized data may be the sensitive data that should not be disclosed. In some cases, the memorized data may be personal information of a user from which training data was obtained and/or the memorized data may provide clues to a competitor trying to reverse engineer the model, how the model was trained, and/or contents of the training data set. Accordingly, machine learning models and/or applications with more privacy-aware capabilities are desired.

Figure 1A:
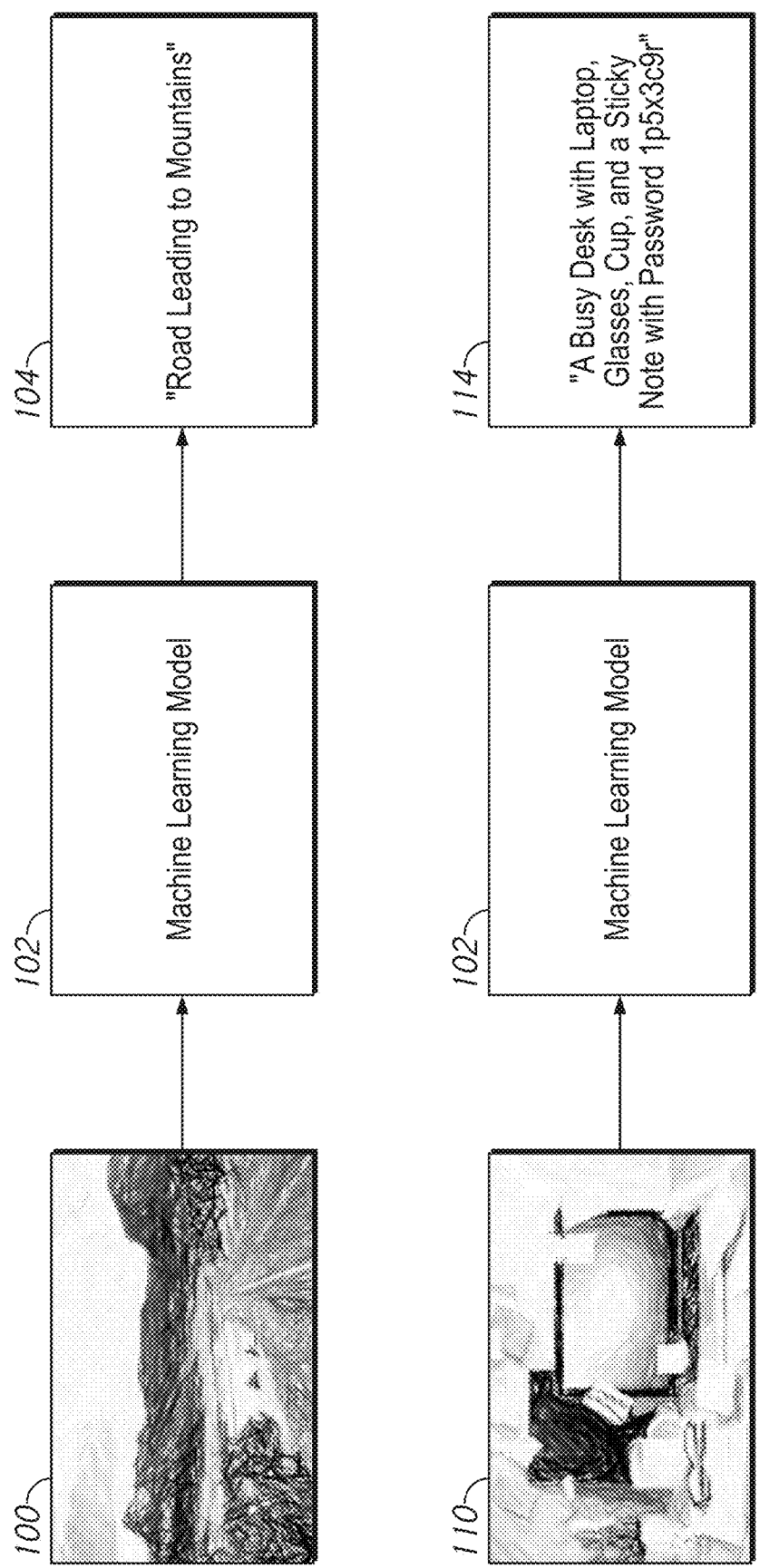
FIG. 1A illustrates examples of a machine learning model that has been trained to provide descriptive text captions for images.

FIG. 1A illustrates examples of a machine learning model 102 that has been trained to provide descriptive text captions for images. The machine learning model 102 is trained to provide a text output for an image input. The training may have included providing a training data set including hundreds or thousands of images (e.g., inputs) with text captions (e.g., desired result) that described the elements included in the images. Based on the training data set, the machine learning model may learn to recognize various elements in images and provide text associated with those elements. In some examples, the machine learning model may include a neural network.

In a first example shown in FIG. 1A, an image 100 is provided to the trained machine learning model 102. The machine learning model 102 analyzes the image 100 and provides a caption 104 "roads leading to mountains" as a result. In a second example, an image 110 is provided to the machine learning model 102. The model analyzes the image 110 and provides a caption 114 "a busy desk with laptop, glasses, cup, and a sticky note with password 1p5x3c9r."

In the first example, the machine learning model 102 provides a caption 104 that reflects the contents of the image 100, but likely also describes many other images. In the second example, the machine learning model 102 provides a caption 114 that reflects the contents of the image 110, but the caption 114 describes the image 110 in more detail and is less likely to describe other images. It may be inferred from caption 114 that the training data set likely included few images of desks with other elements described in caption 114. In this instance, the machine learning model 102 may have memorized a training image and/or its associated captions. In some cases, it may be inferred that image 110 was included in the training data set. This analysis of the results of the machine learning model 102 may allow a user to determine characteristics and/or contents of the training data set and/or determine how the machine learning model 102 was trained.

Furthermore, the caption 114 includes a password. The password may have been in an image in the training data set in some examples. In some instances, the password may be sensitive information that is not desirable to be provided as a result of the machine learning model 102.

Figure 1B:
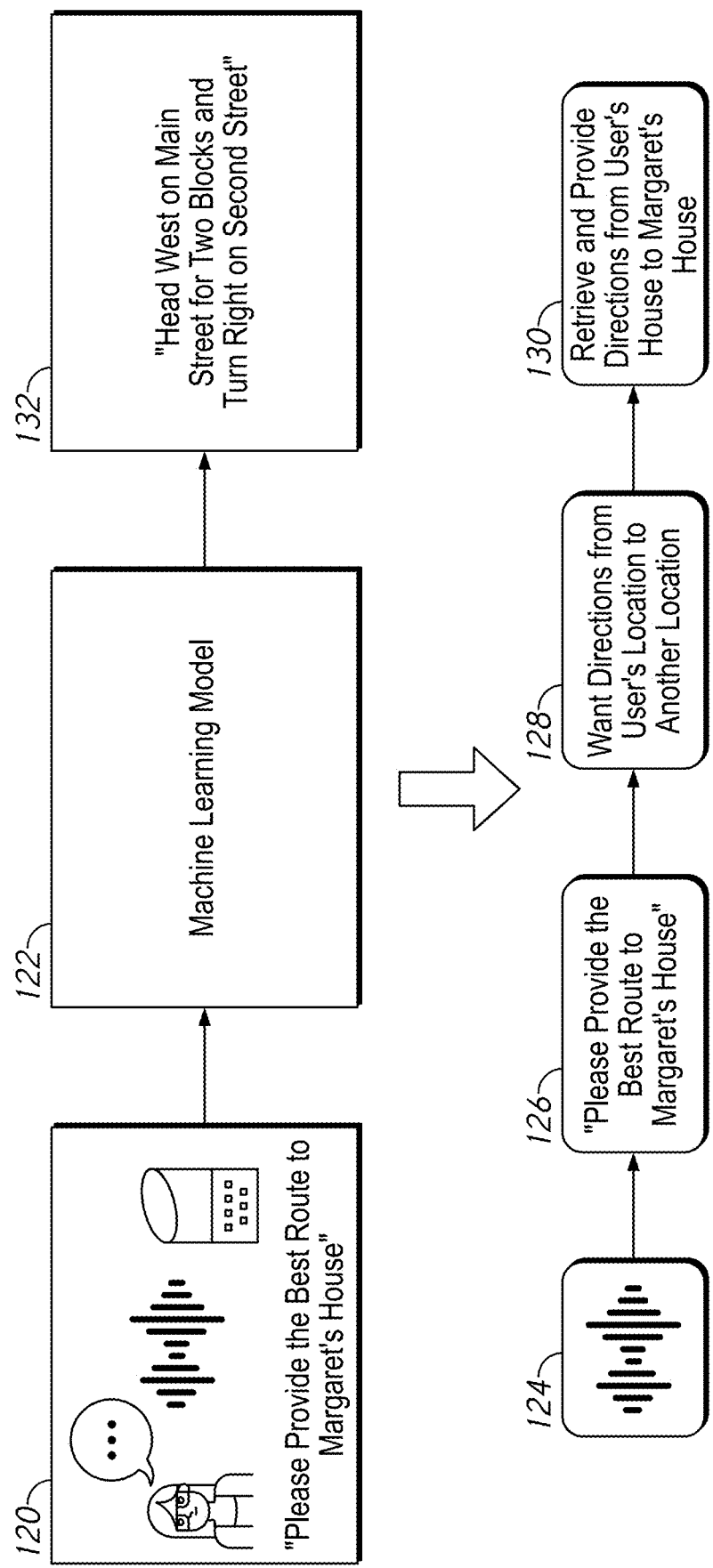
FIG. 1B illustrates examples of a machine learning model that has been trained to provide text outputs for speech inputs.

FIG. 1B illustrates examples of a machine learning model 122 that has been trained to provide text outputs 132 responsive to speech inputs 120. As shown in FIG. 1B, a user may provide a speech input 120 such as "Please provide the best route to Margaret's house" to a computing device. The soundwaves from the speech input 120 may be received by a speaker included with the computing device, and the computing device may provide signals responsive to the soundwaves (e.g., digital signals) to the machine learning model 122, which may be included on the computing device and/or may be on a cloud computing system in communication with the computing device. As shown in block 124, the machine learning model 122 may make inferences from the signals to determine what words were spoken. Once the words are determined as shown by block 126, the machine learning model 122 may infer an intent of the user from the words as shown in block 128. In layman's terms, the machine learning model 122 may determine what the user wants the computing system to do. Based on the inferred intent, the machine learning model 122 may formulate a response (e.g., output) as shown by block 130. The output may then be provided to the user by the computing device, such as by displaying on a screen. In this example, as shown in block 132, the output is directions to Margaret's house.

The output of machine learning model 122 may be desirable if Margaret is a name of a business open to the public or Margaret is an individual known to the user. For example, the user may have provided her personal address book to the computing device for analysis by the machine learning model 122, and Margaret may be a contact in the address book. However, providing directions to Margaret's house to the user may be undesirable if Margaret is an individual and is not known to the user. In these instances, it may be desirable to prevent the computing device from providing the result to the user and/or providing an alternate result such as directions to a business open to the public with a similar sounding name (e.g., "Margarita Hut" in this example).

Although the examples provided in FIG. 1A provides image inputs and text outputs and the example provided in FIG. 1B provides speech inputs and text outputs, machine learning memorization may occur with other data types such as text for both inputs and results, speech data for inputs and results, speech data for inputs and text for results, etc. For example, memorization may occur when text is both the input and the result, such as when a machine learning model suggests words or phrases to a user typing a document (e.g., an email) based, at least in part, on the letters or words the user has already typed. In this example, the user may have typed, "Let's meet at Jane's house at" and if the machine learning model memorized a result based on the input, the machine learning model may provide a suggestion of a specific address for the house. In this case, the privacy of a resident of the specific address may be compromised.

In accordance with examples of the present disclosure, data may be abstracted and/or masked prior to being provided to a machine learning model for training. This may increase "privacy awareness" of the machine learning model and reduce or prevent the machine learning model from "memorizing" sensitive information in some applications. In accordance with examples of the present disclosure, a machine learning model may provide a confidence level associated with a result. If the confidence level is too high, the machine learning model or an application including the machine learning model may refrain from providing the result as an output. In some examples, the no result may be provided when the confidence level of a particular output is too high. In other examples, the machine learning model may provide a "second best" result that has an acceptable confidence level. This "second best" result may be more privacy-aware in that it is less likely to disclose sensitive information. In still other examples, an error signal may be provided as the output. In accordance with examples of the present disclosure, data may be abstracted and/or masked prior to being provided to a machine learning model for training and confidence levels of results of the trained machine learning model may be used to determine when a result should be withheld. Processing data used for training machine learning models and/or not providing a result from the machine learning model under certain conditions may reduce or prevent exposure of sensitive data and/or reverse engineering of the machine learning model, training methods, and/or training data.

Figure 2:
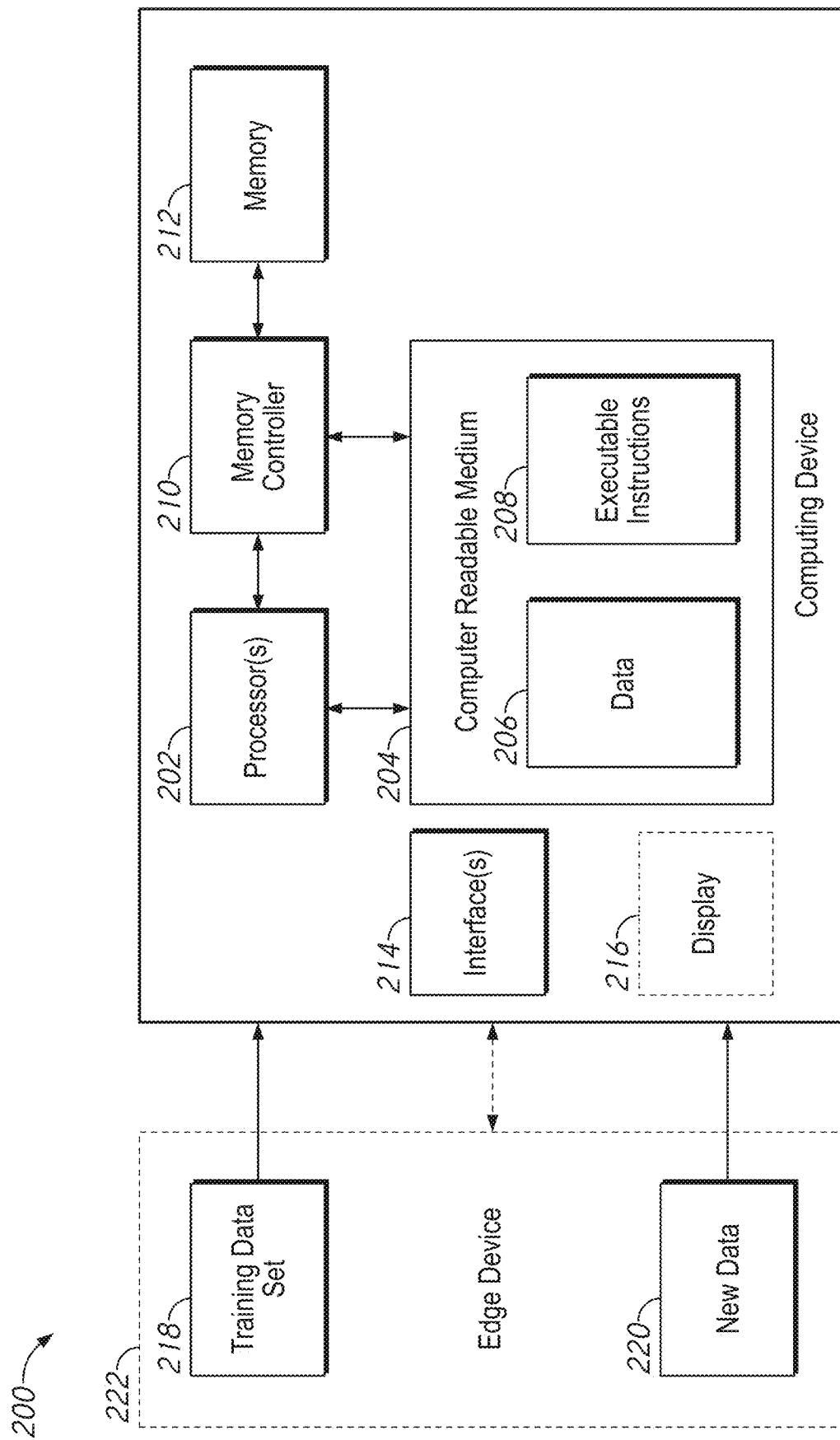
FIG. 2 is a schematic illustration of a computing device arranged in accordance with examples of the present disclosure.

FIG. 2 is a schematic illustration of a computing device arranged in accordance with examples of the present disclosure. The computing device 200 may include processor(s) 202, a computer readable medium (or media) 204, a memory controller 210, a memory 212, and interface(s) 214. In some examples, the computing device 200 may include a display 216.

The computer readable medium 204 may be accessible to the processor(s) 202. The computer readable medium 204 may be encoded with executable instructions 208. The executable instructions 208 may be executed by the processor 202. In some examples, the executable instructions 208 may cause the processor 202 to implement a machine learning application that includes one or more machine learning models. The machine learning application may implement various functions such as generating training data sets, training a machine learning model, and/or applying a trained machine learning model to received data to generate a result. Alternatively or additionally, in some examples, the machine learning application, or a portion thereof, may be implemented in hardware included with the computer readable medium 204 and/or processor(s) 202, for example, application-specific integrated circuits (ASICs) and/or field programmable gate arrays (FPGA).

The computer readable medium 204 may store data 206. In some examples, the data 206 may include one or more training data sets, such as training data set 218. In some examples, training data set 218 may be received from another computing device (e.g., an edge device 222, a cloud computing device). In other examples, the training data set 218 may be generated by the computing device 200. In some examples, the training data sets may be used to train one or more machine learning models. In some examples, the data 206 may include data used in a machine learning model (e.g., weights, connections between nodes). In some examples, the data 206 may include other data, such as new data 220. In some examples, the other data may be analyzed by a trained machine learning model to make an inference (e.g., provide a result/output based on the data). In some examples, the data 206 may include outputs generated by one or more machine learning models implemented by the computing device 200. The computer readable medium 204 may be implemented using any medium, including non-transitory computer readable media. Examples include memory, random access memory (RAM), read only memory (ROM), volatile or non-volatile memory, hard drive, solid state drives, or other storage. While a single medium is shown in FIG. 2, multiple media may be used to implement computer readable medium 204.

In some examples, the processor(s) 202 may be implemented using one or more central processing units (CPUs), graphical processing units (GPUs), ASICs, FPGAs, or other processor circuitry. In some examples, the processor(s) 202 may execute some or all of the executable instructions 208. In some examples, the processor(s) 202 may be in communication with a memory 212 via a memory controller 210. In some examples, the memory 212 may be volatile memory, such as dynamic random access memory (DRAM). The memory 212 may provide information to and/or receive information from the processor(s) 202 and/or computer readable medium 204 via the memory controller 210 in some examples. While a single memory 212 and a single memory controller 210 are shown, any number may be used. In some examples, the memory controller 210 may be integrated with the processor(s) 202.

In some examples, the interface(s) 214 may provide a communication interface to another device (e.g., edge device 222), a user, and/or a network (e.g., LAN, WAN, Internet). The interface(s) 214 may be implemented using a wired and/or wireless interface (e.g., Wi-Fi, BlueTooth, HDMI, USB, etc.). In some examples, the interface(s) 214 may include user interface components which may receive inputs from a use. Examples of user interface components include a keyboard, a mouse, a touch pad, a touch screen, and a microphone. In some examples, the interface(s) 214 may communicate information, which may include user inputs, data 206, training data set 218, and/or new data 220, between external devices (e.g., edge device 222) and one or more components of the computing device 200 (e.g., processor 202 and computer readable medium 204).

In some examples, the computing device 200 may be in communication with a display 216 that is a separate component (e.g., using a wired and/or wireless connection) or the display 216 may be integrated with the computing device. In some examples, the display 216 may display data 206 such as outputs generated by one or more machine learning models implemented by the computing device 200. Any number or variety of displays may be present, including one or more LED, LCD, plasma, or other display devices.

In some examples, the training data set 218 and/or new data 220 may be provided to the computing device 200 via the interface 214. Optionally, in some examples, some or all of the training data sets 218 and/or new data 220 may be provided to the computing device 200 by an edge device 222. In some examples, computing device 200 may provide results, such as inferences made by a machine learning application, to the edge device 222. In some examples, the edge device 222 may also be a computing device that includes similar components to the components shown in computing device 200. In some examples, the edge device 222 may be a mobile device such as a smart phone or tablet. In some examples, the edge device 222 may be a desktop computer or other stationary device. In some examples, edge device 222 and computing device 200 may be included in a computing system, such as a cloud computing system. In this example, the computing device 200 may be a cloud computing device. In some examples, the computing device 200 may be included in a server.

In some examples, computing device 200 may process data (e.g., data 206, training data set 218, and/or new data 220) to mask and/or abstract sensitive information. The processed data may be used to generate a training set for training a machine learning model (e.g., neural network, support vector machine, decision tree). In some examples, the machine learning model may be trained by the computing device 200. In some examples, the trained machine learning model may be implemented by the computing device 200 and/or the computing device 200 may implement one or more other trained machine learning models.

In some examples, the computing device 200 may implement a machine learning model that provides a result (also referred to as an inference) based on an input (e.g., data such as new data 220) as well as a confidence level associated with the result. The machine learning model and/or other components of the computing device 200 may provide an output based on the confidence level associated with the result. For example, if the confidence level is equal or above a threshold, that may suggest that the machine learning model "memorized" a result from the training data set. In this case, the output may not contain the result. In some examples, the computing device 200 may output a different result (such as a result having a second-highest confidence level) from the machine learning model that has a confidence level with an acceptable value (e.g., equal to or below a threshold value) and provide this result as the output. In some examples, the output may include an error signal.

Figure 3:
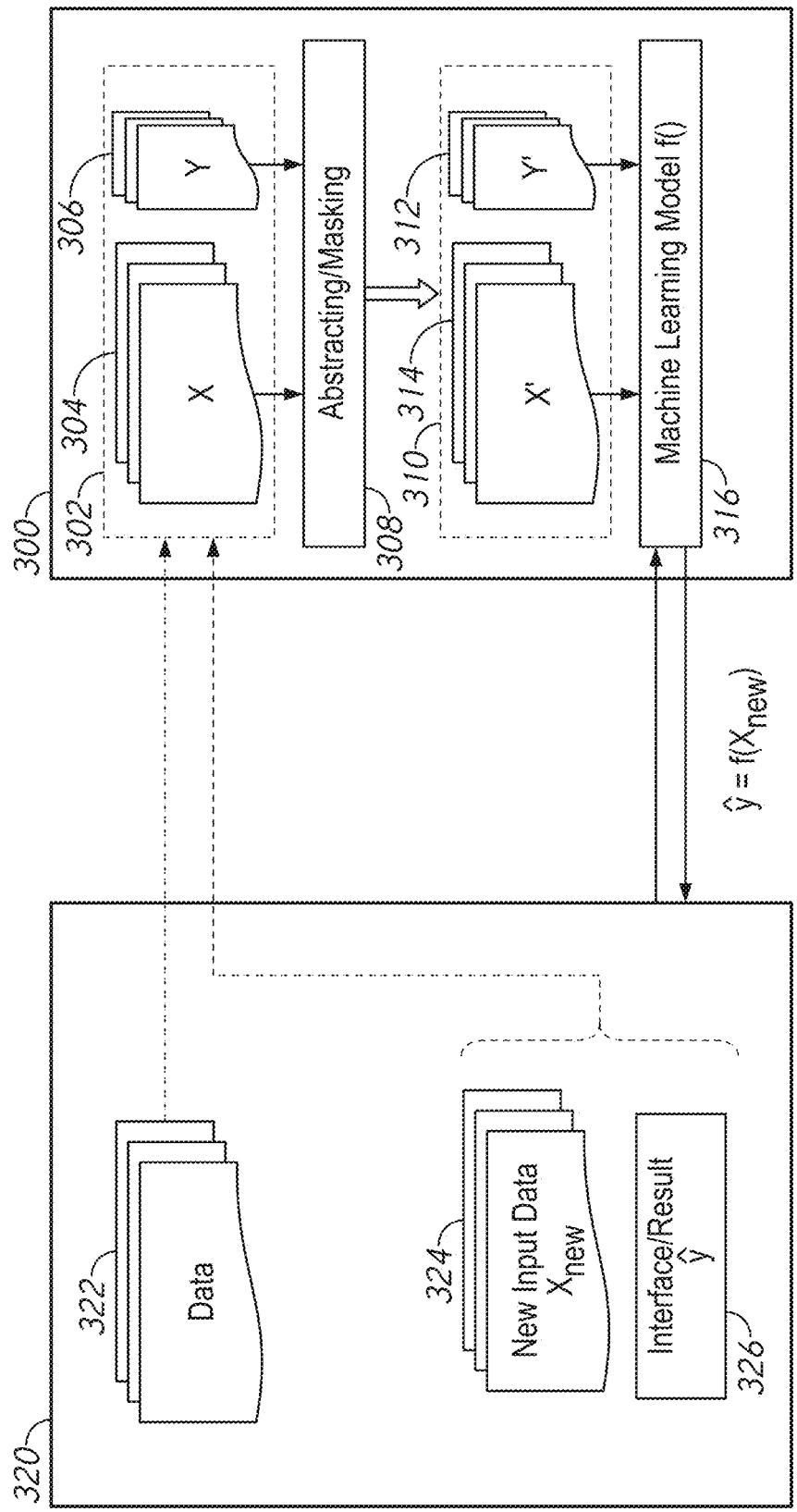
FIG. 3 is a functional block diagram of a machine learning application for abstracting and/or masking data in accordance with examples of the present disclosure.

FIG. 3 is a functional block diagram of a machine learning application 300 for abstracting and/or masking data in accordance with examples of the present disclosure. In some examples, machine learning application 300 may be implemented by computer readable instructions. In some examples, machine learning application 300 may be implemented by hardware, such as FPGAs and/or ASICs. In some examples, machine learning application 300 may be implemented by a combination of computer readable instructions and hardware. In some examples, machine learning application 300 may be implemented by computing device 200 shown in FIG. 2.

The machine learning application 300 may include a training data set 302. The training data set 302 may include one or more inputs (X) 304, each associated with a corresponding result (Y) 306. In some examples, the training data set 302 may be pre-existing. In other examples, the machine learning application 300 may generate the training data set 302 from received data 322. In some examples, the machine learning application 300 may generate the training data by tokenizing received data 322, which is described in more detail with reference to FIG. 4. In some examples, data 322 may be received from a computer readable medium included with a computing device that implements the machine learning application. In some examples, the data 322 may be received from an application 320 implemented by another computing device, such as an edge device 222.

The machine learning application 300 may process the training data set 302 to abstract and/or mask sensitive data and generate a modified training data set 310. As used herein, abstracting data means to replace specific values of a data type with a generic value. For example, a data type may be proper names (e.g., John Smith, Sarah Jones). All proper names in the original data may be replaced with a generic value that indicates a proper name was present in the original data (e.g., NAME, PROPER NAME). In another example, a data type may be a specific date (e.g., Dec. 25, 1978). All specific dates may be replaced with a generic value that indicates a date was present or a relative date was present (e.g., DATE, TODAY'S DATE). As used herein, masking data means to remove a specific values of a data type. When the specific value is removed, it may or may not be replaced with an indication that a value has been removed (e.g., XXX).

The abstracting and/or masking 308 of the training data set 302 may include classifying and/or ranking the data of the training data set 302. Classifying the data refers to analyzing the data and determining one or more data types included in the data. For example, the data may be tokenized and each token of data may be analyzed to determine the data type included in that token. Data type refers to the kind of information included in the data (e.g., date, account number, quantity, pixel intensity, diagnosis). Certain data types may be sensitive data (e.g., proper name, address, account number). Ranking the data refers to analyzing the data and determining how often particular data types and/or values are present in the data. For example, the ranking may determine a number of times the value "benign" appears in the data and/or in data classified as having a "diagnosis" data type.

In some examples, whether a value of the data in the training data set 302 is abstracted or masked may be based, at least in part, on the classification and/or rank of the value. In some examples, if the value is classified as non-sensitive data, the value may not be abstracted or masked regardless of rank. In some examples, if the value is classified as sensitive data, but the rank indicates that the value appears many times in the data (e.g., appears a threshold number of times or represents a percentage of values of a data type above a threshold), the value may be abstracted. In some examples, if the value is classified as sensitive data and the rank indicates that the value is rare (e.g., appears below a threshold number of times or represents a percentage of values of a data type below a threshold), the value may be masked.

In some examples, the abstracting and/or masking 308 may be performed by a rules-based system (e.g., all strings of numbers of a certain length are account numbers). In some examples, the abstracting and/or masking 308 may be performed by a machine learning model trained to identify data types, including sensitive data, in training data sets.

The data of training data set 302 processed by the abstracting and/or masking 308 may be used to generate a modified training data set 310. The modified training data set 310 may include one or more modified inputs (X') 314 and corresponding modified results (Y') 312. The modified training data set 310 may have some or all of the sensitive data from training data set 302 abstracted or removed. The modified training data set 310 may be used to train a machine learning model 316. In some examples, using the modified training data set 310 may reduce or eliminate the risk of the machine learning model 316 "memorizing" sensitive data that could then be provided as a result.

As shown in FIG. 3, once trained, the machine learning model (f( )) 316 may receive new input data ($X_{new}$) 324 and provide a result ($\hat{y}$) 326 based on the new input data 324 such that $\hat{y}=f(X_{new})$. In some examples, such as the one shown in FIG. 3, the new input data 324 may be provided from an application 320, which may be implemented on a separate device, and the machine learning model 316 may provide the result to the application 320. In some embodiments, where machine learning model 316 is dynamically trained, the new input data 324 and results 326 may be included in another training data set 302 that is abstracted and/or masked prior to being used to train the machine learning model 316.

Figure 4:
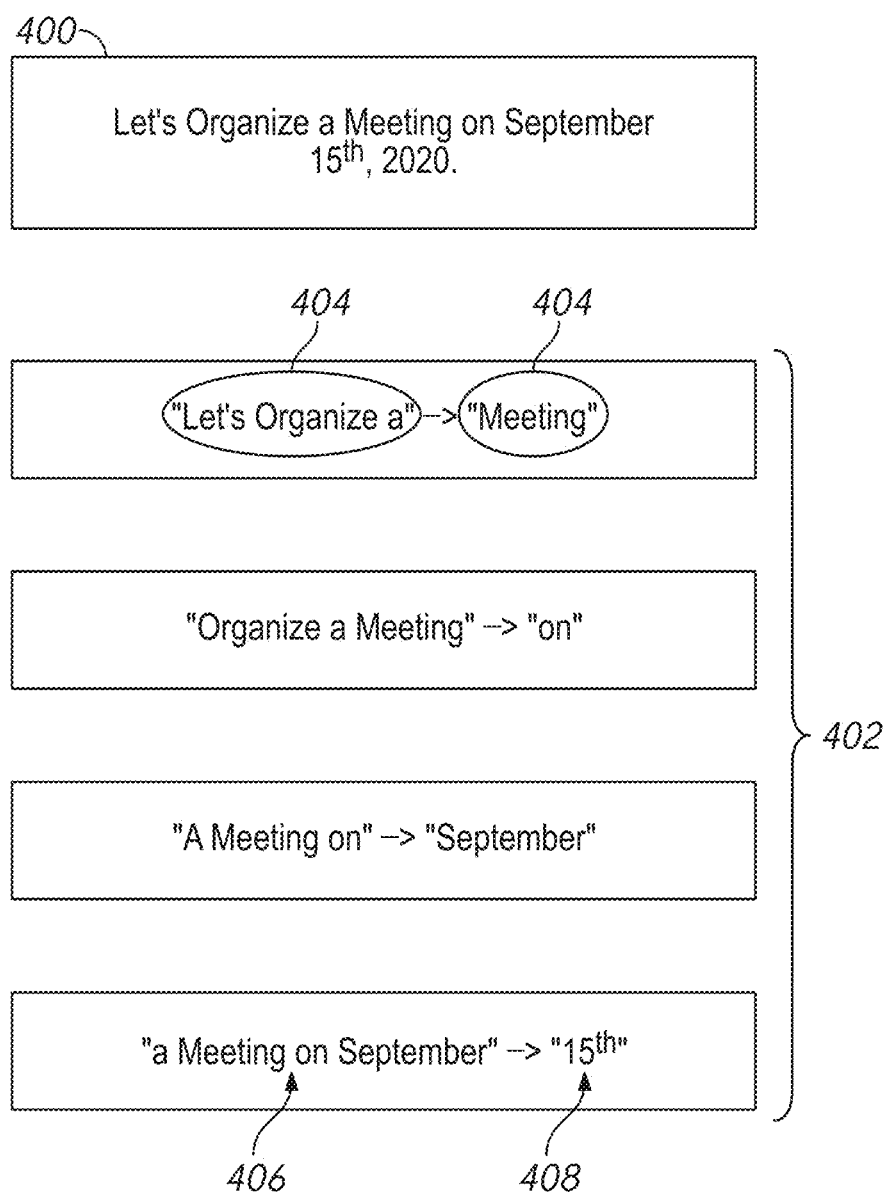
FIG. 4 shows an example of tokenizing data in accordance with examples of the present disclosure.

FIG. 4 shows an example of tokenizing data in accordance with examples of the present disclosure. In some examples, the tokenizing may be performed by a machine learning application, such as machine learning application 300. The original data 400 is a text string "Let's organize a meeting on Sep. 15, 2020." The original data 400 is parsed into segments, referred to as tokens 404, which may be analyzed individually by a machine learning model in some examples. In some examples, such as the one shown in FIG. 4, the original data 400 may be tokenized such that elements of the original data 400 are repeated across different tokens 404. For example, the word "meeting" appears in three different tokens 404 in FIG. 4. The tokens 404 are organized such that tokens 404 of inputs 406 are associated with tokens 404 of desired results 408. All of the sets of inputs 406 and results 408 pairs may be used as a training data set 402 to train a machine learning model.

The example provided in FIG. 4 illustrates tokenizing with text data. In some examples, tokens of text data may be generated using k-grams, but other methods may also be used. Furthermore, the example provided in FIG. 4 is merely illustrative and the disclosure is not limited to text data or the particular method of tokenization shown.

Figure 5:
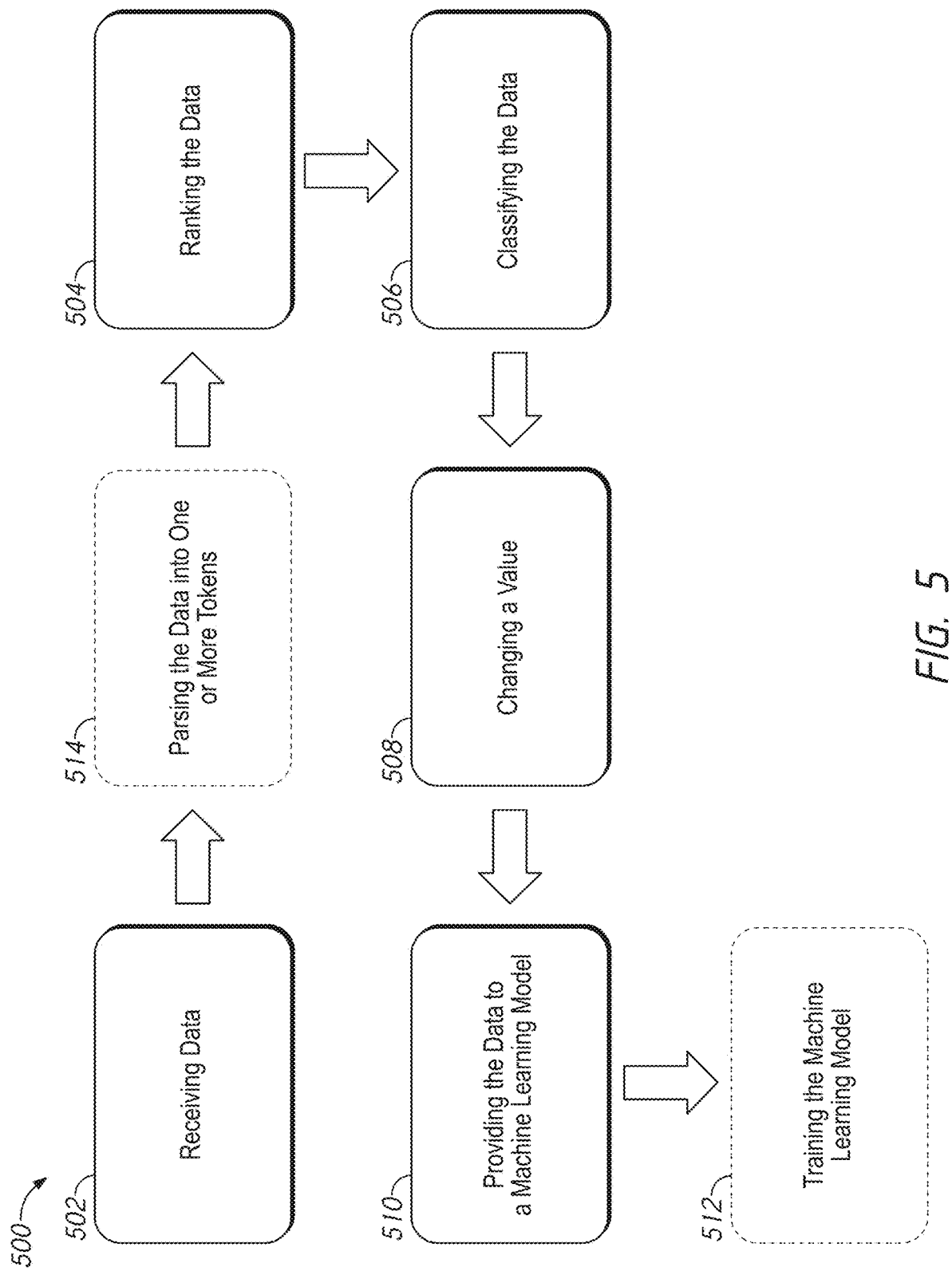
FIG. 5 is a flow chart of a method in accordance with examples of the present disclosure.

FIG. 5 is a flow chart of a method 500 in accordance with examples of the present disclosure. In some examples, all or a portion of method 500 may be performed by a computing device, for example, computing device 200 shown in FIG. 2. In some examples, all or a portion of the method 500 may be performed by a machine learning application, such as machine learning application 300 shown in FIG. 3, which in some examples may be implemented by a computing device such as computing device 200.

At block 502, "receiving data" may be performed. In some examples, the data may be received by an interface, such as interface 214. In some examples, the data may include text, images, and/or sound data. In some examples, the data may be received from an edge device, such as edge device 222.

At block 504, "ranking the data" may be performed. In some examples, a rank may indicate a number of times one or more values is included in the data. At block 506, "classifying the data," may be performed. In some examples, a classification may indicate one or more data types included in the data. In some examples, the classifying may be a rules-based classification. In some examples, the classifying may be performed by a machine learning model, such as a neural network. In some examples, block 506 may be performed before block 504. In some examples, block 504 and 506 may be performed simultaneously.

At block 508, "changing a value" may be performed. In some examples, a value of one or more values included in the data may be changed. In some examples, the value may be abstracted or masked. How the value is changed and/or whether the value is changed may be based, at least in part, on the rank and classification of the value in some examples. In some examples, changing the value may include masking the value when the classification indicates the data type of the value is sensitive data and the rank indicates the number of times the value is included in the data is equal to or below a threshold value. In some examples, changing the value may include abstracting the value when the classification indicates the data type of the value is sensitive data and the rank indicates the number of times the value is included in the data is equal to or above a threshold value. In some examples, sensitive data may include proper names, dates, addresses, passwords, birth dates, account numbers, and/or user names.

At block 510, "providing the data to a machine learning model" may be performed. The data provided to the machine learning model may include the changed values in some examples. That is, the data provided to the machine learning model may be modified from the data originally received at block 502. In some examples, the data may be used as a training data set to train the machine learning model. Optionally, at block 512, "training the machine learning model" may be performed. The machine learning model may be trained with the training data set.

Optionally, in some examples, "parsing the data into one or more tokens" may be performed at block 514. In some examples, individual ones of the tokens may include at least a portion of the data received at block 502. In some examples, such as the one shown in FIG. 5, the parsing may be performed prior to ranking and/or classifying the data.

Figure 6:
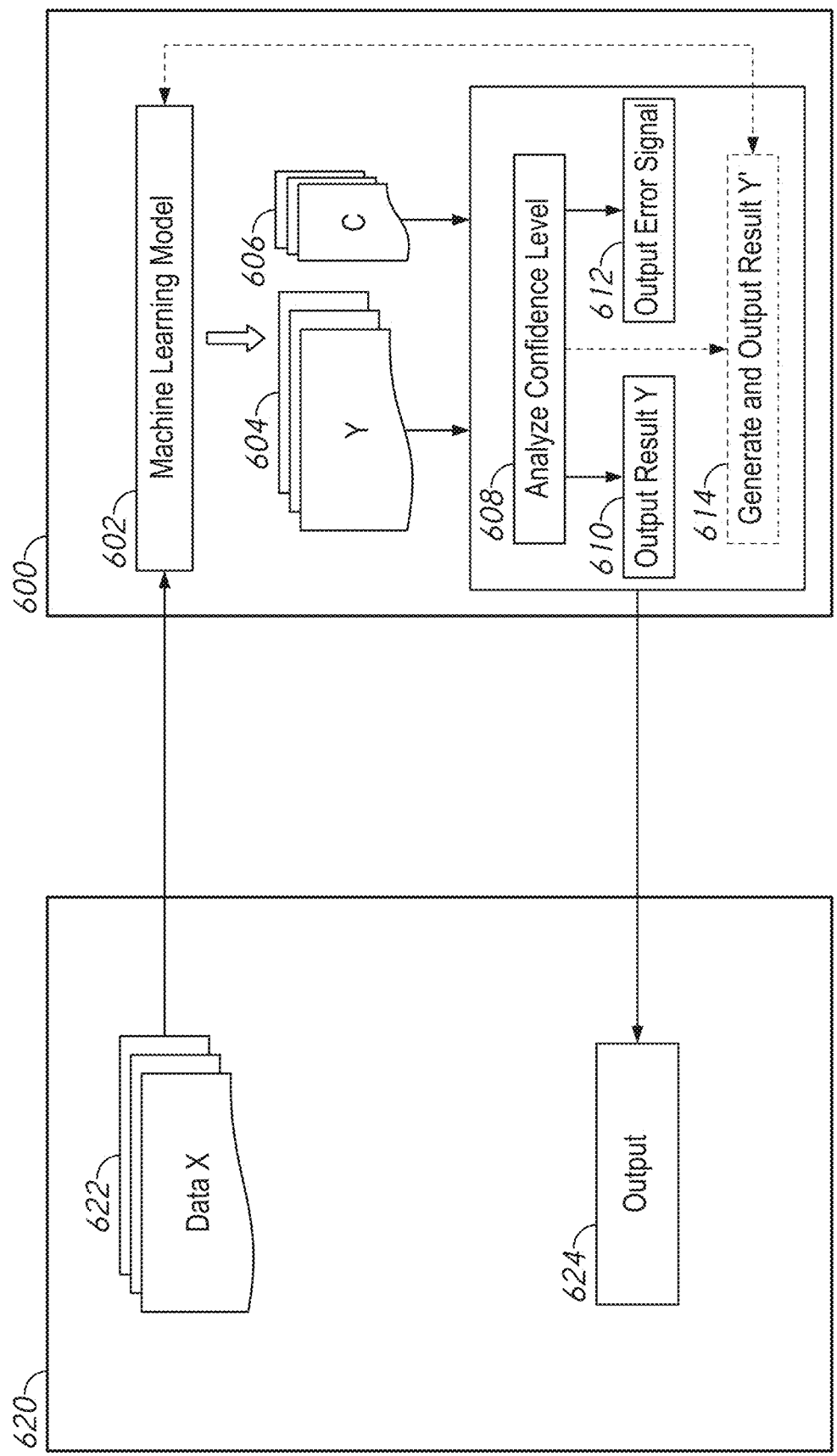
FIG. 6 a functional block diagram of a machine learning application for providing outputs in accordance with of the present disclosure.

FIG. 6 a functional block diagram of a machine learning application 600 for providing outputs in accordance with of the present disclosure. In some examples, machine learning application 600 may be implemented by computer readable instructions. In some examples, machine learning application 600 may be implemented by hardware, such as FPGAs and/or ASICs. In some examples, machine learning application 600 may be implemented by a combination of computer readable instructions and hardware. In some examples, machine learning application 600 may be implemented by computing device 200 shown in FIG. 2. In some examples, machine learning application 600 may be used in combination with and/or be included with machine learning application 300 shown in FIG. 2. For example, machine learning model 602 may be included in machine learning model 316 or machine learning model 316 may be included in machine learning model 602.

In some examples, the machine learning application 600 may include a machine learning model 602 that may be trained to generate a result (Y) 604 (e.g., an inference) based on data (X) 622 provided to the machine learning model 602 as an input. The machine learning model 602 may generate a confidence level (C) 606 associated with the result 604. The confidence level 606 may represent a degree of certainty (e.g., probability) that the machine learning application 600 has provided a correct or desired result 604 based on the data 622. Determining the confidence level 606 is described in more detail with reference to FIGS. 7 and 8. Typically, providing results with low confidence levels is undesirable. However, in machine learning models, absolute or near absolute certainty is rare. Thus, confidence levels corresponding to such certainty may indicate that the machine learning model 602 memorized a result from a training data set (not shown in FIG. 6) used to train the machine learning model 602. In some applications, results with high confidence levels may be more likely to include sensitive data and/or may expose information regarding the machine learning model and/or training data set. Accordingly, it may be desirable to refrain from providing result 604 if the confidence level 606 is high.

In some examples, the confidence level 606 may be analyzed as shown at block 608. In some examples, block 608 may include a comparator which may compare the confidence level 606 to one or more threshold values. In some examples, the confidence level 606 may be compared to a threshold value that may confirm that the result 604 does not include a memorized result from a training data set. In some examples, the threshold value may represent a high certainty or probability that the result 604 is the correct or desired result based on the data 622. For example, the threshold value may be 0.99 or 1.00 in some examples.

Optionally, in some examples, another threshold value may confirm that the confidence level 606 is high enough to provide a correct result 604 with an acceptable level of reliability. What threshold value corresponds to an acceptable level of reliability may vary depending on the application. For example, in some applications, a threshold value of 0.51 may be an acceptable confidence level. In other applications, a threshold value of 0.60 may be an acceptable confidence level. In other applications, a threshold value of 0.80, 0.90, or 0.95 may be an acceptable confidence level. In some applications, a threshold level may not be used and a classification having a highest probability (and/or highest probability after removing any classifications with probabilities greater than an upper threshold value) may be returned as result 604.

Based on the analysis of the confidence level 606, the machine learning application 600 may provide an output 624. In some examples, if the analysis of the confidence level 606 determines that the result 604 is not a memorized result (e.g., the confidence level 606 is equal to or below a threshold value), the output 624 may include the result 604 as indicated by block 610. In some examples, if the analysis of the confidence level 606 determines that the result 604 is a memorized result (e.g., the confidence level 606 is equal to or above a threshold value), the output 624 may not include the result 604. In some examples, as indicated by block 612, the output 624 may include an error signal. The error signal may indicate that no result can be provided for the input data 622. Optionally, in some examples, the error signal may be provided when the confidence level 606 is equal to or below a threshold value that indicates that the result 604 is not reliable (e.g., has a low probability of being the correct and/or desired output for the data 622).

Optionally, in some examples, if the confidence level 606 indicates the result 604 is a memorized result, the machine learning application 600 may generate another result (Y') from the machine learning model 602 that has a confidence level that indicates the result is not memorized. That is, the confidence level for the new result Y' may be lower than the confidence level 606 associated with the original result 604. In some instances, the result Y' may represent a "second best" result. The result Y' may then be included in the output 624 as indicated by block 614.

In some examples, the data 622 may be provided by a separate application 620, which may be included on a computing device separate from the computing device which implements machine learning application 600. For example, application 620 may be on an edge device, such as edge device 222. In some examples, the output 624 may be provided to the application 620.

In some applications, concern over including memorized results in the output 624 may vary depending on the source of the data 622, the source of the training data set used to train machine learning model 602, what the output 624 is provided to, and/or a user of the machine learning application 600. For example, if an administrator is using the machine learning application 600, the threshold value may be set high (e.g., 1.0) for determining whether a result is memorized or not. An example of an administrator may be software engineer at a company that owns the machine learning application 600 who is testing the machine learning application 600. In another example, if a user accessing the machine learning application 600 (e.g., a user of application 620) is also the source of the training data set, the threshold value may also be set high. For example, when a smart compose machine learning model 602 was trained only on the user's own emails. In a further example, if a user is not an administrator and the machine learning model 602 was not trained solely on data from the user, the threshold value may be set lower (e.g., 0.97, 0.98, 0.99).

Figure 7:
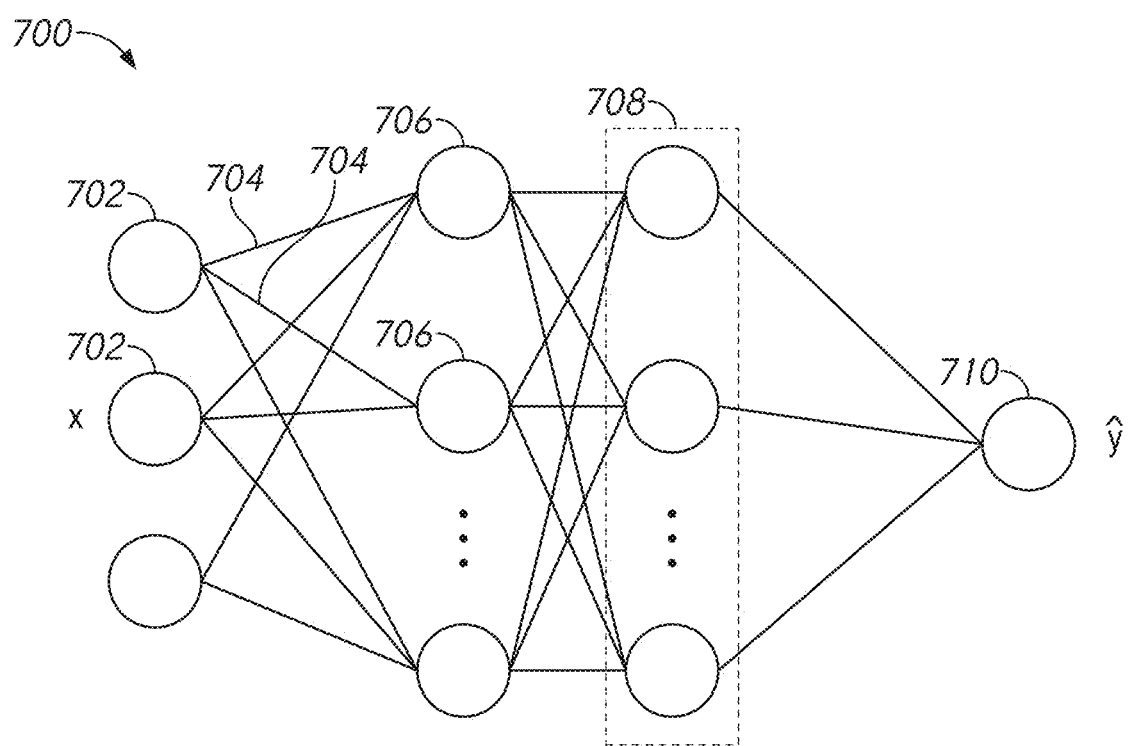
FIG. 7 is a diagram of a neural network in accordance with examples of the present disclosure.

FIG. 7 is a diagram of a neural network 700 in accordance with examples of the present disclosure. In some examples, the neural network 700 may be included in a machine learning model, such as machine learning model 316 and/or machine learning model 602. In some examples, neural network 700 may be deterministic. The neural network 700 may include input nodes 702. In some examples, the input nodes 702 may be organized in a layer. The input nodes 702 may be coupled to one or more layers of hidden units 706 by weights 704. In some examples, the hidden units 706 may perform operations on one or more inputs from the input nodes 702 based, at least in part, with the associated weights 704. The outputs of the hidden units 706 may be provided to an output layer 708 that can return confidence values, that is, values associated with a level of confidence in a result inferred by the neural network 700. The output layer 708 may calculate a confidence values (e.g., confidence levels) associated with a result Y provided to a result node 710.

In some examples, the output layer 708 may use a softmax function to calculate the confidence value of classification or regression output. The softmax function may be represented as:

$$\mathrm{softmax}(\hat{y}) = \frac{e^{\hat{y}^{(n)}}}{\sum_n e^{\hat{y}^{(n)}}}$$

Where $\mathrm{softmax}(\hat{y})$ is used as the confidence values of the output, $\hat{y}$ is the output and n is the number of outputs. However, variations of the softmax equation (e.g., argmax) or other equations or specialized additional layers may be used to calculate the confidence level in other examples.

Figure 8:
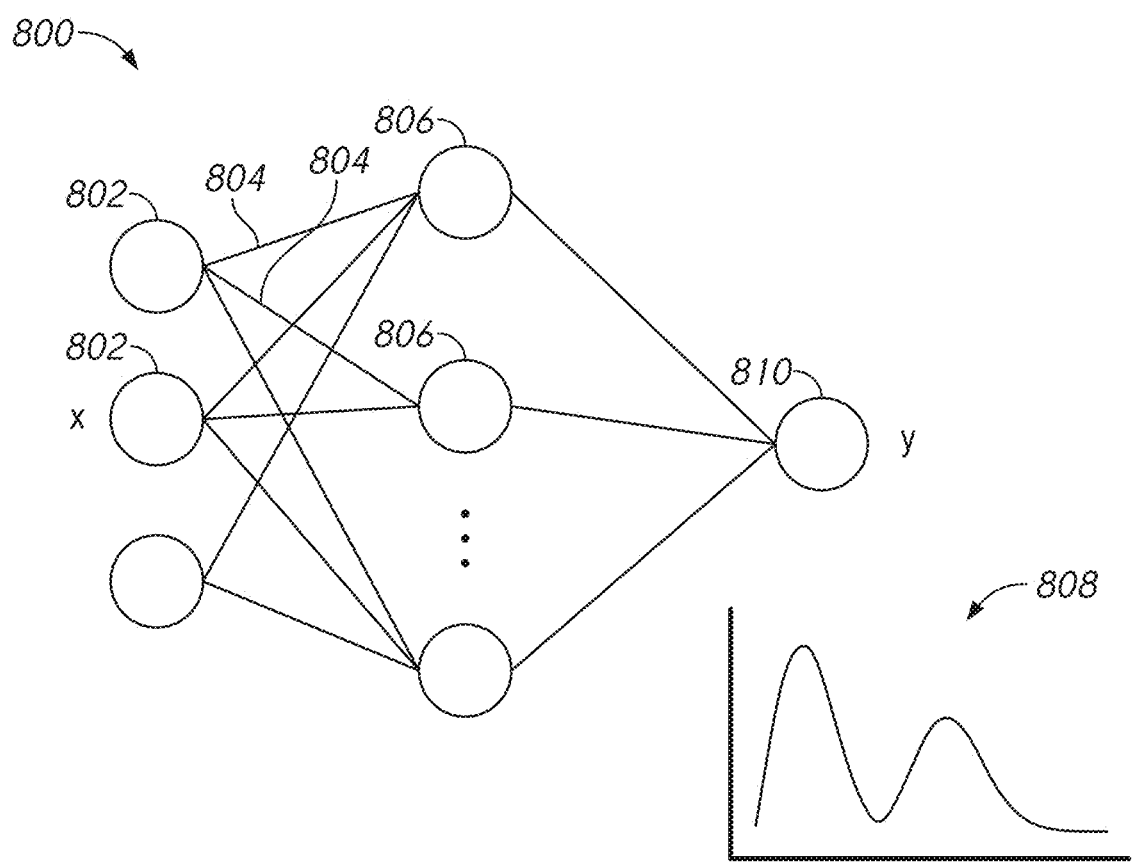
FIG. 8 is a diagram of a neural network and example of the output probability distribution in accordance with examples of the present disclosure.

FIG. 8 is a diagram of a neural network 800 in accordance with examples of the present disclosure. In some examples, the neural network 800 may be included in a machine learning model, such as machine learning model 316 and/or machine learning model 602. In some examples, neural network 800 may be stochastic (e.g., a Bayesian representation). Similar to neural network 700, the neural network 800 may include input nodes 802. In some examples, the input nodes 802 may be organized in a layer. The input nodes 802 may be coupled to one or more layers of hidden units 806 by weights 804. In some examples, the hidden units 806 may perform operations on one or more inputs from the input nodes 802 based, at least in part, with the associated weights 804. The outputs of the hidden units 806 may be provided to a result node 810. However, unlike neural network 700, the result at result node 810 is not a single value but a distribution of outputs Y 808. In some examples, the distribution of outputs Y may be used to estimate the confidence level from the probability distribution represented as:

$$p(y^{(n)}|x^{(n)}, \theta)$$

Where $\theta$ are weights of the neural network 800 and p is the conditional probability distribution on the output layer, from which confidence level is derived. Other distributions or analysis of the distribution of outputs 808 may be used in other examples to determine the confidence level. The techniques for determining the confidence level shown in FIGS. 7 and 8 are provided for exemplary purposes only and the disclosure is not limited to the examples provided.

Figure 9:
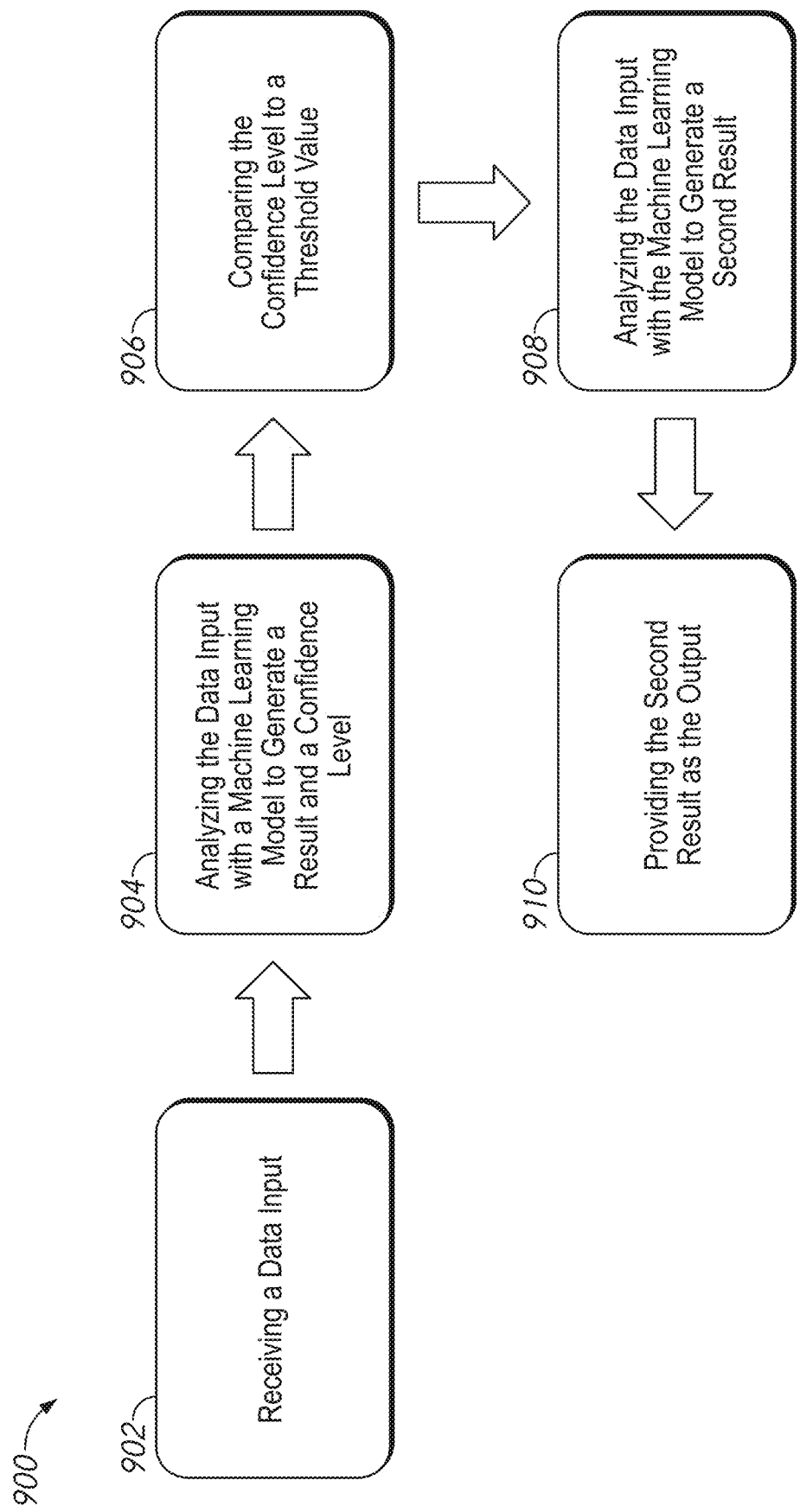
FIG. 9 is a flow chart of a method in accordance with examples of the present disclosure.

FIG. 9 is a flow chart of a method 900 in accordance with examples of the present disclosure. In some examples, all or a portion of method 900 may be performed by a computing device, for example, computing device 200 shown in FIG. 2. In some examples, all or a portion of the method 900 may be performed by a machine learning application, such as machine learning application 600 shown in FIG. 6 and/or machine learning application 300 shown in FIG. 3, which in some examples may be implemented by a computing device such as computing device 200.

At block 902, "receiving a data input" may be performed. In some examples, the data input may be received by an interface, such as interface 214. In some examples, the data input may include text, images, and/or sound data. In some examples, the data input may be received from an edge device, such as edge device 222.

At block 904, "analyzing the data input with a machine learning model to generate a result and a confidence level" may be performed. In some examples, the machine learning model may be a neural network. In some examples, the neural network may be deterministic. In some examples, the confidence level may be generated based, at least in part, on a softmax algorithm, such as the one referred to in FIG. 7. In some examples, the neural network may be stochastic. In some examples, the confidence level may be generated based, at least in part, on a distribution of the results.

At block 906, "comparing the confidence level to a threshold value" may be performed. In some examples, the comparing may be performed by a comparator. At block 908, "providing an output based on the comparing" may be performed. In some examples, the output may be provided from a computing device, such a computing device 200 to an edge device, such as edge device 222.

In some examples, the output includes an error signal when the confidence level is equal to or above the threshold value. In some examples, the output includes the result when the confidence level is equal to or below the threshold value. In some examples, the threshold value is 0.99. In some examples, the threshold value is based, at least in part, on a type of user of the machine learning model. Types of users may include regular users and administrators, for example. In some examples, the threshold value is based, at least in part, on a source of a training data set used to train the machine learning model and a user of the machine learning model. In some examples, the threshold value is higher when the source of the training data set is the user than when the source of the training data set is not the user.

Optionally, when the confidence level is equal to or above the threshold value, in some examples, blocks 908 and 910 may be performed to provide a more privacy-aware result. At block 908, "analyzing the data input with the machine learning model to generate a second result" may be performed. The second result may have a second confidence level below the threshold value in some examples. At block 910, "providing the second result as the output" may be performed.

In some examples, method 900 may be performed during and/or after method 500.

Figure 10:
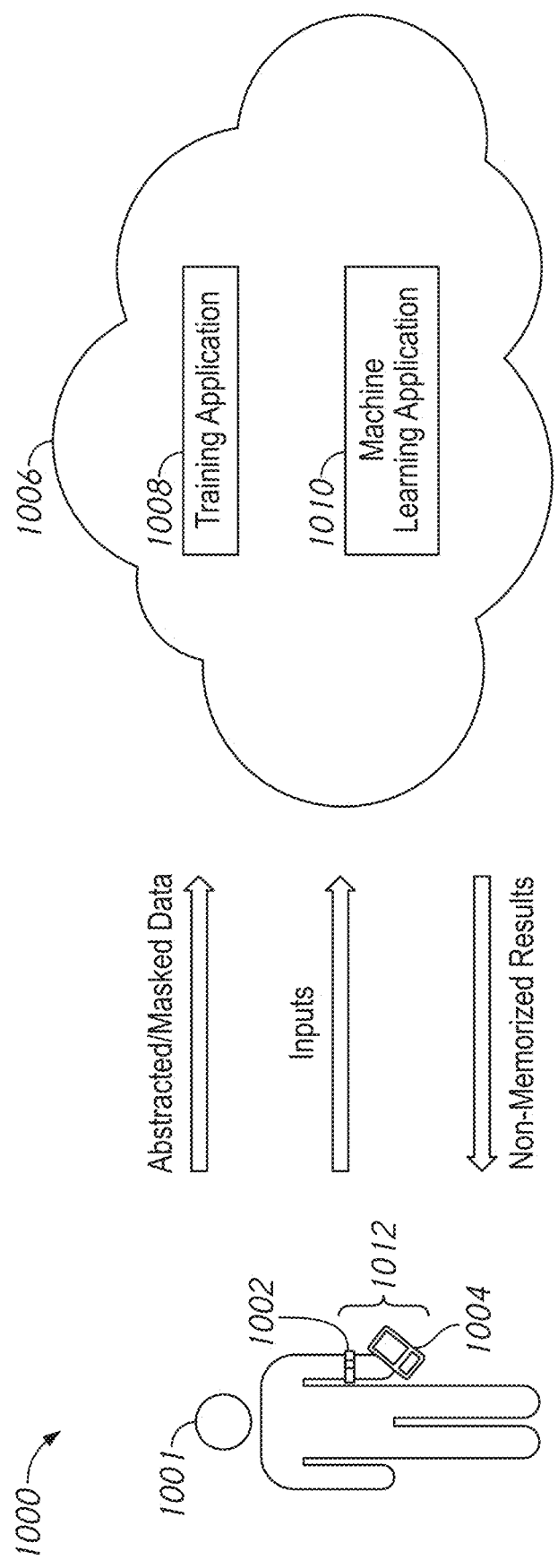
FIG. 10 is a computing system in accordance with examples of the present disclosure.

FIG. 10 is a computing system 1000 in accordance with examples of the present disclosure. The computing system 1000 may include one or more edge devices 1012, such as a wearable (e.g., a smart watch) 1002 and/or a mobile device (e.g., smart phone, tablet) 1004. The wearable 1002 and/or mobile device 1004 may be operated by a user 1001. The computing system 1000 may further include a cloud computing system 1006, which may include one or more computing devices (e.g., computing device 200).

In some examples, the edge devices 1012 may implement one or more machine learning applications, such as applications 300, 320, 600, and/or 620, or portions thereof. For example, the edge devices 1012 may implement a machine learning application that abstracts and/or masks data collected by the edge device 1012. For example, the wearable 1002 may collect fitness data (e.g., user location, heart rate, miles per hour, workout duration) and the machine learning application implemented by the wearable 1002 may abstract and/or mask certain values in the fitness data (e.g., exact locations).

In some examples, the cloud computing system 1006 may implement one or more machine learning applications, such as applications 300, 320, 600, and/or 620, or portions thereof. For example, the cloud computing system 1006 may include a training application 1008 that generates training data sets and/or trains a machine learning model. In some examples, the abstracted and/or masked data may then be provided from the edge device 1012 to the training application 1008. The training application 1008 may use the abstracted and/or masked data from the edge device 1012 to train a machine learning model. In this example, since the abstracting and/or masking is performed on the edge device 1012, little or no sensitive data may be transmitted by the edge device 1012 and/or received by the cloud computing system 1006. This may provide additional security for sensitive information in some applications.

In some examples, the cloud computing system 1006 may include a machine learning application 1010 that generates results based on inputs provided from the edge devices 1012. In some examples, the machine learning application 1010 may implement a machine learning application, such as machine learning application 600, which suppresses memorized results. In some examples, only non-memorized results (e.g., results having a confidence level equal to or below a threshold value) are provided from the cloud computing system 1006 to the edge devices 1012. In some applications, this may reduce the risk of sensitive data being released by the cloud computing system 1006 and/or other information that may allow reverse engineering of the machine learning application 1010.

The apparatuses, systems, and methods of the present disclosure may enable more privacy-aware operations of machine learning models, applications, and/or systems. The apparatuses, systems, and methods described herein may abstract and/or mask values in data prior to providing the data to a machine learning model for training. This may reduce or prevent the machine learning model from memorizing sensitive information in some applications. Furthermore, the apparatuses, systems, and methods of the present disclosure may analyze a confidence level associated with a result from a machine learning model. If the confidence level is too high, the result may not be provided as an output. Abstracting and/or masking data used for training machine learning models and/or not providing a result from the machine learning model under certain conditions may reduce or prevent exposure of sensitive data and/or reverse engineering of the machine learning model, training methods, and/or training data. In some applications, this may improve privacy protection of individuals and/or entities.

The foregoing description of certain embodiments is merely exemplary in nature and is in no way intended to limit the scope of the disclosure or its applications or uses. In this detailed description of embodiments of the present apparatuses, systems and methods, reference is made to the accompanying drawings which form a part hereof, and which are shown by way of illustration specific embodiments in which the described apparatuses, systems and methods may be practiced. These embodiments are described in sufficient detail to enable those skilled in the art to practice presently disclosed apparatus, systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The discussion herein is therefore not to be taken in a limiting sense, and the scope of the disclosure is defined only by the appended claims. As used herein, the term "apparatus" may refer to a circuit, device, system, component, or combinations thereof. For example, an apparatus may be a computing device, a processor, a memory, a memory device, a mobile device, an edge device, a server, and/or a cloud computing system.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative and should not be construed as limiting the appended claims to any particular embodiment or group of embodiments. Thus, while various embodiments of the disclosure have been described in particular detail, it should also be appreciated that numerous modifications and alternative embodiments may be devised by those having ordinary skill in the art without departing from the broader and intended spirit and scope of the present disclosure as set forth in the claims that follow. Accordingly, the specification and drawings are to be regarded in an illustrative manner and are not intended to limit the scope of the appended claims.

What is claimed is:

1. An apparatus comprising:
   a processor; and
   a non-transitory computer readable medium configured to store an input received from another device, wherein the non-transitory computer readable medium is encoded with instructions that when executed by the processor cause the processor to:
   generate from the input, using a machine learning model, a first value indicative of a result and a second value indicative of a confidence level of the result;
   compare the second value to a first threshold value, wherein the first threshold value is indicative of the first value comprising a third value memorized from a training data set used to train the machine learning model, wherein the third value memorized comprises sensitive information;
   compare the second value to a second threshold value, wherein the second threshold value is indicative of an acceptable level of reliability of the result; and
   provide an output to the other device based on that comparing with the first threshold value, wherein the output excludes at least a portion of the sensitive information.

2. The apparatus of claim 1, wherein the output includes the result when the second value is equal to or less than the first threshold value.

3. The apparatus of claim 1, wherein the output includes an error signal when the second value is equal to or greater than the first threshold value.

4. The apparatus of claim 1, wherein the other device is a mobile device.

5. The system of claim 1, wherein the machine learning model is trained using a modified training data set, wherein the modified training data set includes at least one of a masked value or an abstracted value.

6. The system of claim 5, wherein at least some of the data from the modified training data set is received from the other device.

7. A method comprising:
receiving a data input;
generating from the data input, using a machine learning model, a first value indicative of a result and a second value indicative of a confidence level of the result;
comparing the second value to a first threshold value, wherein the first threshold value is indicative of the first value comprising a third value memorized from a training data set used to train the machine learning model, wherein the third value memorized comprises sensitive information;
comparing the second value to a second threshold value, wherein the second threshold value is indicative of an acceptable level of reliability of the result; and
providing an output based on the comparing with the first threshold value, wherein the output excludes at least a portion of the sensitive information.

8. The method of claim 7, wherein the output includes an error signal when the second value is equal to or above the first threshold value.

9. The method of claim 7, further comprising:
when the second value is equal to or above the first threshold value:
analyzing the data input with the machine learning model to generate a fourth value indicative of a second result and a fifth value indicative of a second confidence level, wherein the fifth value is below the first threshold value; and
providing the fourth value as the output.

10. The method of claim 7, wherein the output includes the first value when the second value is equal to or below the first threshold value.

11. The method of claim 7, wherein the second value is generated based, at least in part, on a softmax algorithm.

12. The method of claim 7, wherein the second value is generated based, at least in part, on a distribution of the first value.

13. The method of claim 7, further comprising training the machine learning model using a modified training data set, wherein the modified training data set includes at least one of a masked value or an abstracted value.

14. An apparatus comprising:
a processor; and
a non-transitory computer readable medium configured to store data, wherein the non-transitory computer readable medium is encoded with instructions that when executed by the processor, cause the processor to:
generate a first value indicative of a rank, wherein the first value indicates a number of times one or more values is included in the data;
generate a second value indicative of a classification, wherein the second value indicates one or more data types included in the data;
change a value of the one or more values included in the data based on the first value and the second value, wherein the first value, the second value, or a combination thereof is indicative of sensitive information of the value; and
generate a training data set comprising the data including the value changed, wherein the value changed excludes at least a portion of the sensitive information of the value; and
train a machine learning model with the training data set.

15. The apparatus of claim 14, wherein the instructions implement a second machine learning model to generate the second value.

16. The apparatus of claim 15, wherein the second machine learning model is a neural network.

17. The apparatus of claim 14, wherein the instructions implement a rules-based classification system to generate the second value.

18. The apparatus of claim 14, wherein the value of the one or more values is changed to an abstract value when the second value indicates the data type of the value is sensitive data and the first value indicates the number of times the value is included in the data is equal to or above a threshold value.

19. The apparatus of claim 14, wherein the value of the one or more values is changed to a masked value when the second value indicates the data type of the value is sensitive data and the first value indicates the number of times the value is included in the data is equal to or below a threshold value.

20. A training method comprising:
receiving data;
generating a first value indicative of a rank, wherein the first value indicates a number of times one or more values is included in the data;
generating a second value indicative of a classification, wherein the second value indicates one or more data types included in the data;
changing a value of the one or more values included in the data based on the first value and the second value, wherein the first value, the second value, or a combination thereof is indicative of sensitive information of the value;
generating a training data set comprising the data comprising the value changed, wherein the value changed excludes at least a portion of the sensitive information of the value; and
training a machine learning model with the training data set.

21. The training method of claim 20, wherein changing the value comprises masking the value when the second value indicates the data type of the value is sensitive data and the first value indicates the number of times the value is included in the data is equal to or below a threshold value.

22. The training method of claim 21, wherein the sensitive data includes at least one of proper names, dates, addresses, passwords, birth dates, account numbers, or user names.

23. The training method of claim 20, wherein changing the value comprises abstracting the value when the second value indicates the data type of the value is sensitive data and the first value indicates the number of times the value is included in the data is equal to or above a threshold value.

24. The training method of claim 20, wherein the second value is generated by a rules-based classification.

25. The training method of claim 20, wherein the second value is generated by a second machine learning model.

* * * * *